UNITED STATES PATENT OFFICE.

ROBERT ILLEMANN, OF PORT DUNDAS, GLASGOW, SCOTLAND.

BITUMINOUS COMPOSITION.

1,296,083. Specification of Letters Patent. Patented Mar. 4, 1919.

No Drawing. Application filed October 10, 1917. Serial No. 195,719.

*To all whom it may concern:*

Be it known that I, ROBERT ILLEMANN, a citizen of the United States of America, and residing at Port Dundas, Glasgow, Scotland, have invented a certain new and useful Improved Bituminous Composition, of which the following is a specification.

This invention has for its object to make an improved bituminous cement or composition out of a combination of bitumen, or pitch, whether natural or artificial, and clay, or clay loam, or a like clayey substance or earth.

It is well known that ordinary clay or clay loam, by itself, has considerable cohesive or binding properties and will, when dry, constitute, more or less, a firm substance, but, in the dry state, it has the disadvantage that, when in contact with water, it will readily absorb the same and thereafter soften and lose its binding properties.

Now, the object of this invention is to produce an argilliferous and bituminous (or pitch) composition or compound which has the advantage that it does not require to be heated to render it liquid for use, as has hitherto been the practice with ordinary pitch and the like. The finished composition or compound, which contains a large percentage of water, has the peculiar property that it can be thinned or reduced merely by the addition of water and that it can then be laid on or over surfaces in the same manner as ordinary Portland cement, concrete, or lime plaster, without requiring heat to be applied to it as is the case with bitumen, pitch or tar.

The bitumen (or pitch) for the composition is used in a condition which may vary from that of a more or less plastic substance to that of a brittle solid at a temperature of 60° F.

The composition is made in the following manner:—I take the plastic solid or brittle solid bitumen (or pitch) and place it in a vessel and heat it until it is brought to the fluid condition; the clay (or clay loam) being mixed with water, in another vessel, until it is also brought to a fluid condition and then the clay-fluid is poured into the vessel containing the fluid bitumen and the whole mass is, while heated, thoroughly stirred, the process being continued until the ingredients are thoroughly emulsified. An important point to be observed in this process is that the moisture must not be driven off or evaporated, and to prevent this the product is removed from the vessel immediately after the manufacture. If the moisture is driven off the product will, when removed from the source of heat, quickly set hard when it will be incapable of being mixed with, or thinned, or reduced, by water. The emulsified mixture is plastic and has the appearance of a thickish liquid or paste and can be poured off or allowed to run off into vessels or barrels, or otherwise, and is immediately ready for use as a cement. The composition will, if confined, remain, owing to the amount of moisture in it, in the pasty condition for a considerable time and can be readily rendered fluid by the addition of water.

The ingredients are mixed together in or about the following proportions, by weight, namely:—

5 parts bitumen or pitch,
3 parts clay, and
3 parts water.

The composition is very useful in place of tar, or such like, for surfacing roads as it requires no heat to render it sufficiently fluid.

The bituminous cement can be laid *in situ* for flat roofs, footpaths, foundations, Macadam road construction, etc., or it may be cast or be molded without heat or pressure into the shape of blocks or slabs.

Having now fully described my invention, what I claim and desire to secure by Letters Patent is:—

1. A moist and plastic composition capable of being rendered fluid without the aid of heat and merely by the addition of water thereto, made of bitumen (pitch), brought to a fluid condition by heat, an argilliferous substance brought to a fluid condition by water the two fluids being mixed while heated and being thoroughly stirred until emulsified, the heat being such that the moisture is not driven off or evaporated from the mixture.

2. A moist and plastic composition capable of being rendered fluid without the aid of heat, and merely by the addition of water thereto, made of bitumen (pitch) brought to a fluid condition by heat, an argilliferous substance brought to a fluid condition by water the two fluids being thereafter mixed together while heated and being thoroughly stirred until emulsified, the heat being such that the moisture is not driven off or evaporated from the mixture and the ingredients being mixed together in or about the proportions by weight of 5 parts bitumen (pitch) 3 parts clay, and 3 parts water, substantially as described.

In testimony whereof I affix my signature in presence of two witnesses.

ROBERT ILLEMANN.

Witnesses:
   HUGH D. FITZPATRICK,
   WILLIAM FLEMING.